United States Patent
Gong (10) Patent No.: US 12,319,275 B2
(45) Date of Patent: Jun. 3, 2025

(54) MAPPING METHOD AND APPARATUS, VEHICLE, READABLE STORAGE MEDIUM, AND CHIP

(71) Applicant: Xiaomi EV Technology Co., Ltd., Beijing (CN)

(72) Inventor: Shiwei Gong, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 261 days.

(21) Appl. No.: 17/977,197

(22) Filed: Oct. 31, 2022

(65) Prior Publication Data

US 2024/0017719 A1    Jan. 18, 2024

(30) Foreign Application Priority Data

Jul. 15, 2022   (CN) .......................... 202210832856.X (51) Int. Cl.
*B60W 30/06*    (2006.01)
*G06V 20/58*    (2022.01)

(52) U.S. Cl.
CPC ........... *B60W 30/06* (2013.01); *G06V 20/586* (2022.01); *B60W 2420/403* (2013.01); *B60W 2420/408* (2024.01); *B60W 2554/4041* (2020.02)

(58) Field of Classification Search
CPC .................................................. B60W 30/06
See application file for complete search history.

(56) References Cited

U.S. PATENT DOCUMENTS

| 6,738,699 B2 * | 5/2004 | Yao ........................ B62D 5/006 |
| | | 701/41 |
| 9,740,944 B2 * | 8/2017 | Micks .................. G06V 10/776 |
| 11,035,958 B2 * | 6/2021 | Feng ......................... G06T 7/70 |
| 11,227,398 B2 * | 1/2022 | Xiao ........................ G06V 20/56 |
| 2017/0177954 A1 | 6/2017 | Micks et al. |
| 2020/0158875 A1 | 5/2020 | Feng et al. |

(Continued)

FOREIGN PATENT DOCUMENTS

| CN | 106840177 A | 6/2017 |
| CN | 108944915 A | 12/2018 |

(Continued)

OTHER PUBLICATIONS

"An English-Chinese Dictionary of Artificial Intelligence," Sep. 30, 2019.

(Continued)

*Primary Examiner* — Michael A Berns
(74) *Attorney, Agent, or Firm* — Volpe Koenig (57) ABSTRACT

A mapping method that includes obtaining a multi-frame image of a parking scene by a camera every other first time interval, obtaining point cloud data of the parking scene by a laser radar every other second time interval, identifying wheel stop information in the multi-frame image by a pre-trained wheel stop identification model, obtaining a wheel stop classification result by fusing the wheel stop information in the multi-frame image, building an initial wheel stop three-dimensional map based on a vehicle positioning result and the wheel stop classification result, and obtaining a wheel stop three-dimensional map by revising the initial wheel stop three-dimensional map in combination with wheel stop position information in the point cloud data.

16 Claims, 4 Drawing Sheets

(56) References Cited

U.S. PATENT DOCUMENTS

| | | | |
|---|---|---|---|
| 2021/0004613 A1 | 1/2021 | Yang et al. | |
| 2021/0334988 A1 | 10/2021 | Xiao et al. | |
| 2024/0017719 A1* | 1/2024 | Gong | G06V 20/586 |
| 2024/0054793 A1* | 2/2024 | Imai | G06V 10/44 |

FOREIGN PATENT DOCUMENTS

| | | | |
|---|---|---|---|
| CN | 110794970 A | 2/2020 | |
| CN | 111860072 A | 10/2020 | |
| CN | 111951305 A | 11/2020 | |
| CN | 112721921 A | 4/2021 | |
| CN | 112862894 A | 5/2021 | |
| CN | 113119958 A | 7/2021 | |
| CN | 113793371 A | 12/2021 | |
| CN | 114119886 A | 3/2022 | |
| CN | 114413881 A | 4/2022 | |
| JP | 2019166856 A | 10/2019 | |
| WO | 2022138123 A1 | 6/2022 | |

OTHER PUBLICATIONS

Chinese Decision of Rejection issued on Sep. 23, 2023 for Chinese Patent Application No. 202210832856.X.

Chinese Supplementary Search Report issued on Sep. 13, 2023 for Chinese Patent Application No. 202210832856.X.

Intelligent Algorithm for Image Segmentation, ISBN 978-7-113-27932-5, Xiaoli Zhao, Aug. 31, 2021.

Zhang et al., "3-D visualization and information management system design based on open scene graph", (2016).

Kim et al., "Dotloom:Toward a Decentralized Data Platform for Massive Three-dimensional Point Clouds", (2019).

Feng, "Construction of Aerial Corridor for Unmanned Aircraft Systems in Low Altitude Airspace Based on Point Cloud of Laser Scanner", (2018).

Zhao et al., "UAV Scene modelling based on 3D lidar", (2020).

He et al., "3D Reconstruction Algorithm Based on Sparse Laser Point-cloud and Single-frame Images", (2017).

Chinese Office Action issued on Apr. 22, 2024 for Chinese Patent Application No. 202210832856X.

* cited by examiner

MAPPING METHOD AND APPARATUS, VEHICLE, READABLE STORAGE MEDIUM, AND CHIP

CROSS REFERENCE TO RELATED APPLICATIONS

The disclosure is based on and claims the priority of Chinese Patent Application No. 202210832856.X, filed on Jul. 15, 2022, the entire contents of which are incorporated herein by reference.

BACKGROUND

A high-precision map is an important module in automatic parking, including auxiliary information such as a lane, a lane line, a parking garage line, a wheel stop and a speed bump. A library of these rich map elements makes positioning in the parking process more robust, and can obtain a higher precision, so that the automatic parking technology can be generalized to different parking scenes. At the same time, the requirements for the description accuracy of these map elements are also higher. For example, the wheel stop can guide a vehicle to enter a suitable garage depth, so the expression of the wheel stop in the high-precision map will be accurate to a centimeter level. Thus, it can be seen that the three-dimensional reconstruction of a wheel stop obstacle is an important part of an automatic parking assistant system.

SUMMARY

The disclosure provides a mapping method and apparatus, a vehicle, a readable storage medium, and a chip.

According to a first aspect of the examples of the disclosure, provided is a mapping method, including: obtaining a multi-frame image of a parking scene by a camera every other first time interval; obtaining point cloud data of the parking scene by a laser radar every other second time interval; identifying wheel stop information in the multi-frame image by a pre-trained wheel stop identification model; obtaining a wheel stop classification result by fusing the wheel stop information in the multi-frame image; building an initial wheel stop three-dimensional map based on a vehicle positioning result and the wheel stop classification result; and obtaining a wheel stop three-dimensional map by revising the initial wheel stop three-dimensional map in combination with wheel stop position information in the point cloud data.

According to a second aspect of the examples of the disclosure, provided is a vehicle, including: a processor; and a memory configured to store processor-executable instructions; where the processor is configured to execute the executable instructions to implement the steps of the mapping method.

According to a third aspect of the examples of the disclosure, provided is a computer-readable storage medium, having computer program instructions stored, where when the computer program instructions are executed by a processor, the steps of the mapping method provided in the first aspect of the disclosure are implemented.

According to a fourth aspect of the examples of the disclosure, provided is a chip, including a processor and an interface; where the processor is configured to read instructions to perform the steps of the mapping method.

It should be understood that the above general description and the following detailed description are only illustrative and explanatory, and do not limit the disclosure.

BRIEF DESCRIPTION OF THE DRAWINGS

The drawings here are incorporated into the description and form a part of the description, illustrate the examples consistent with the disclosure, and are used together with the description to explain the principles of the disclosure.

DETAILED DESCRIPTION

Examples will be described in detail here, examples of which are illustrated in the accompanying drawings. When the following description refers to the drawings, the same numerals in different drawings refer to the same or similar elements unless otherwise indicated. The examples described in the examples below are not intended to represent all examples consistent with the disclosure. Rather, they are merely examples of the apparatus and the method consistent with some aspects of the disclosure as detailed in the appended claims.

It can be understood that "a plurality of" in the disclosure refers to two or more, and other quantifiers are similar to this. "and/or" describes an association relationship between associated objects, indicating that there can be three relationships, for example, A and/or B can mean that A exists alone, A and B exist at the same time, and B exists alone. The character "/" generally indicates that the associated objects before and after are in an "or" relationship. The singular forms "a," "said," and "the" are also intended to include the plural forms unless the context clearly indicates otherwise.

It can be further understood that the terms "first," "second," etc., are used to describe various information, but such information should not be limited to these terms. These terms are only used to distinguish the same type of information from each other and do not indicate a specific order or importance. In fact, expressions such as "first" and "second" can be used interchangeably. For example, the first time interval can also be called the second time interval. Similarly, the second time interval can also be called the first time interval without departing from the scope of the disclosure.

It can be further understood that in the examples of the disclosure, although operations are described in a particular order in the accompanying drawings, they should not be understood as requiring that these operations be performed in the particular order or serial order shown, or that all the operations shown be performed to obtain the desired results. In certain circumstances, multitasking and parallel processing may be advantageous.

It should be noted that all the actions of obtaining signals, information, or data in the disclosure are carried out under the premise of complying with the corresponding data protection regulations and policies of the local country and with the authorization of the corresponding apparatus owner.

The disclosure relates to the technical field of autonomous driving and, in particular relates to a mapping method and apparatus, a vehicle, a readable storage medium, and a chip.

It should be noted that the mapping method is also referred to map construction method or map building method.

In the related art that has been disclosed, there is a technical solution regarding the high-precision map for automatic parking. At present, the identification and reconstruction technology of the wheel stop obstacle has been studied by some companies in the field of automatic parking. Some solutions are based on high-precision acquisition equipment and later data production. Map elements in the parking scene are collected in advance through measuring equipment such as a scanning radar and an image sensor, and data collected in advance are processed by manual annotation during data production, which has high cost and low efficiency.

Figure 1:
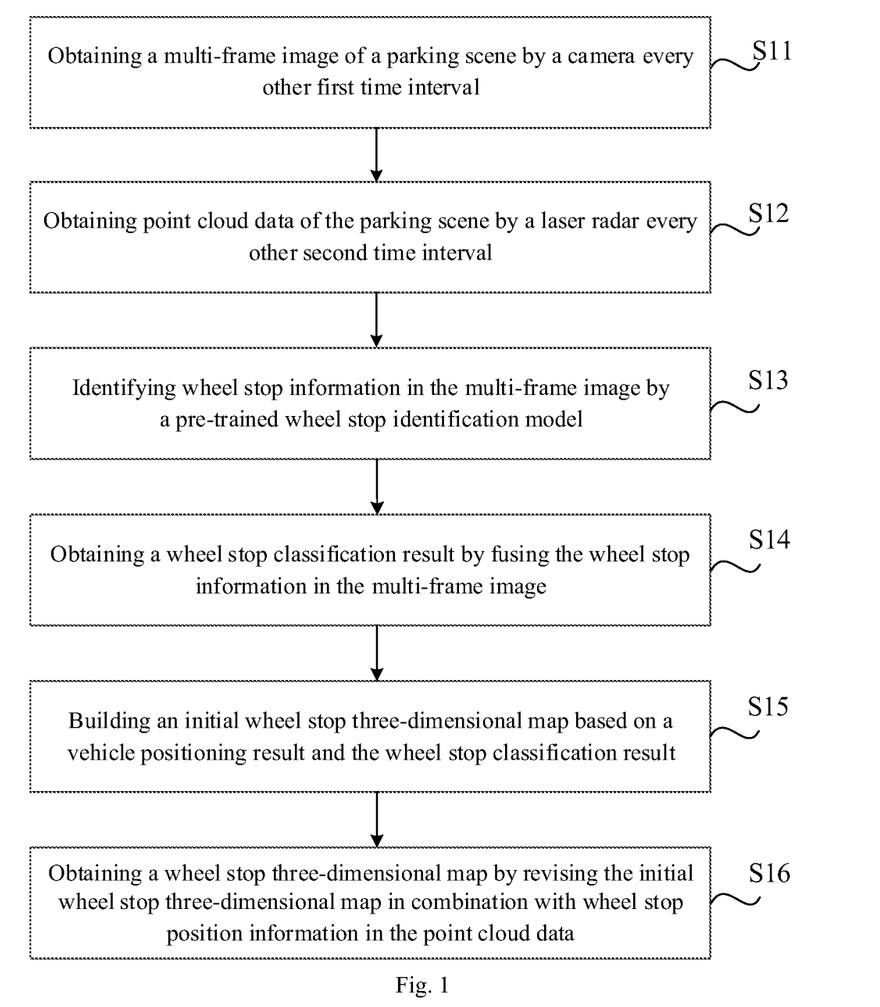
FIG. 1 is a flowchart of a mapping method shown according to one example.

To solve the above problem, the disclosure proposes a mapping method; FIG. 1 is a flowchart of a mapping method shown according to one example. As shown in FIG. 1, the mapping method is applied to an electronic device, such as a control device integrated into a vehicle, and the mapping method includes the following steps:

In step S11, a multi-frame image of a parking scene is obtained by a camera every other first time interval.

The vehicle is equipped with camera sensors for image acquisition, such as a periscopic camera and a panoramic camera. The first time interval can be at a millisecond level, so visually, the camera obtains the multi-frame image of the parking scene in real time, and these images contain some map elements of the parking scene, such as a wheel stop, a lane, a lane line, a parking garage line, a speed bump, etc.

In step S12, point cloud data of the parking scene is obtained by a laser radar every other second time interval.

The vehicle is equipped with a sensor for image acquisition, such as a laser radar for point cloud acquisition. The laser radar can be, but is not limited to, a millimeter wave radar, a laser radar, a V2X device, or a millimeter wave radar. The second time interval can be at a millisecond level, so visually, the laser lidar obtains the point cloud data about the parking scene in real time, and these point cloud data contain position information of some map elements of the parking scene, such as position information of a wheel stop.

In step S13, wheel stop information in the multi-frame image is identified by a pre-trained wheel stop identification model.

The wheel stop information in the multi-frame image is identified by the pre-trained wheel stop identification model. The wheel stop information includes a wheel stop type, a wheel stop width, a wheel stop length, pixel coordinates of a wheel stop, and the like. It should be noted that the multi-frame image here is obtained in real time by the camera, and the wheel stop identification model also identifies the multi-frame image in real time. Every time the camera obtains an image, the wheel stop identification model performs an image identification.

In step S14, a wheel stop classification result is obtained by fusing the wheel stop information in the multi-frame image.

The multi-frame image obtained by the camera each time includes different wheel stops at different angles and distances. The wheel stops can be classified according to the wheel stop information identified by the wheel stop identification model, and a same wheel stop can be classified into one category as a first classification result.

In step S15, an initial wheel stop three-dimensional map is built based on a vehicle positioning result and the wheel stop classification result.

The vehicle positioning result includes pose information of a vehicle and an operational trajectory of a vehicle. The pose information, the operational trajectory, and the wheel stop classification result are combined to model a wheel stop as line segments in space. The directions and spatial positions of the line segments are optimally adjusted by bundle adjustment to obtain a first-wheel stop three-dimensional map. The first wheel stop three-dimensional map is updated according to the latest wheel stop information in the multi-frame image of the parking scene newly obtained by the camera when a new image is obtained by the camera to obtain the initial wheel stop three-dimensional map. The visually reconstructed position of the wheel stop in space is thus obtained.

In step S16, a wheel stop three-dimensional map is obtained by revising the initial wheel stop three-dimensional map in combination with wheel stop position information in the point cloud data.

Through the management of the point cloud data, point cloud information near the wheel stop can be obtained, position information of three-dimensional line segments of the wheel stop is fitted by the point cloud near the wheel stop, and the initial wheel stop three-dimensional map is revised according to the position information to obtain the wheel stop three-dimensional map. The wheel stop position information in the point cloud data can obtain more accurate position information than the visual reconstruction results.

The image of the parking scene is obtained in real time by a camera device, the wheel stop in the image is identified in real time by the pre-trained wheel stop identification model, the three-dimensional reconstruction of the wheel stop is automatically performed, the point cloud data of the parking scene is obtained in real time by a laser radar device, and the three-dimensional reconstruction of the wheel stop is optimized in combination with the wheel stop position information in the point cloud data to obtain a more accurate wheel stop three-dimensional map, which avoids the problems of high cost and low efficiency of manual annotation.

Figure 2:
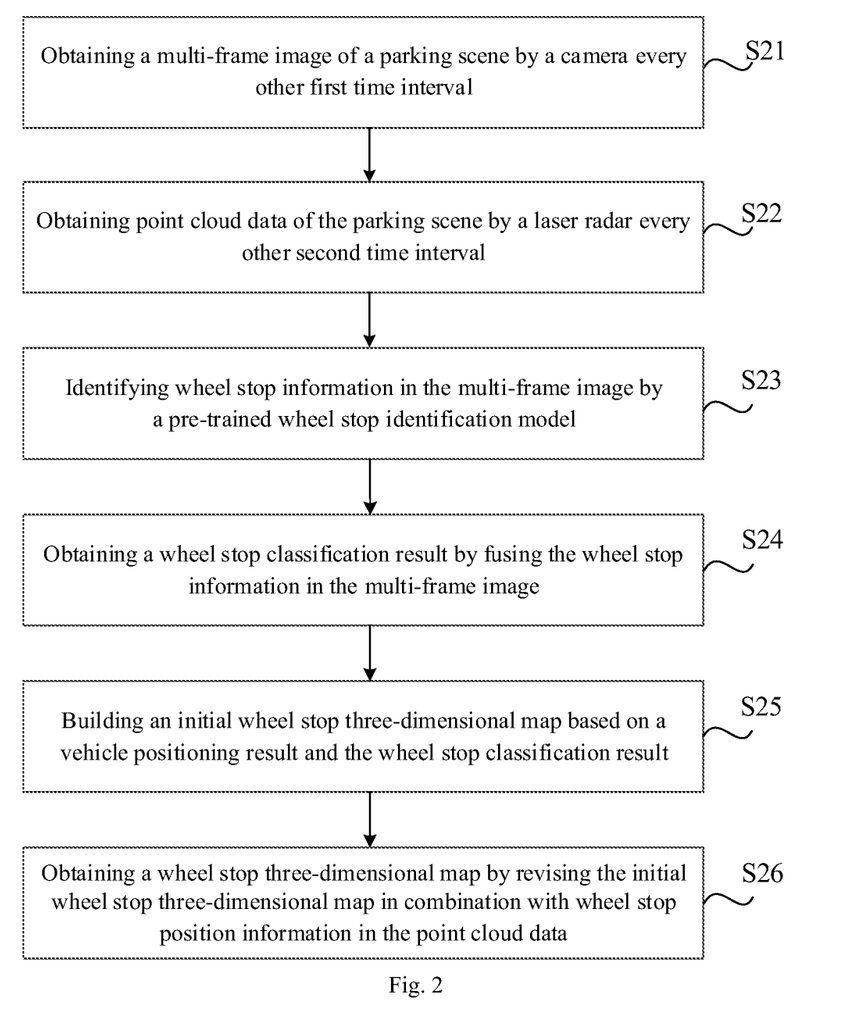
FIG. 2 is a flowchart of another mapping method shown according to one example.

Referring to FIG. 2, FIG. 2 is a flowchart of another mapping method shown according to the examples of the disclosure.

It should be noted that the mapping method shown in FIG. 2 is consistent with the mapping method shown in FIG. 1. In the examples, those not mentioned in FIG. 2 can refer to the description of FIG. 1, which will not be repeated here, and the mapping method shown in FIG. 2 includes the following steps:

In step S21, a multi-frame image of a parking scene is obtained by a camera every other first time interval.

For example, a vehicle can be equipped with camera sensors for image acquisition, such as a periscopic camera and a panoramic camera. The first time interval can be at a millisecond level, so visually, the camera obtains the multi-frame image of the parking scene in real time, and these images contain some map elements of the parking scene, such as a wheel stop, a lane, a lane line, a parking garage line, a speed bump, etc.

In step S22, point cloud data of the parking scene is obtained by a laser radar every other second time interval.

For example, the vehicle can be equipped with a sensor for image acquisition, such as a laser radar for point cloud acquisition, and the laser radar can be, but is not limited to, a millimeter wave radar, a laser radar, a V2X device or a millimeter wave radar. The second time interval can be at a millisecond level, so visually, the laser lidar obtains the point cloud data of the parking scene in real time, and these point cloud data contain position information of some map elements of the parking scene, such as position information of a wheel stop. In one example, the second time interval may be the same as the first time interval or different from the first time interval.

In addition to mounting the camera and the laser lidar device on the vehicle, the vehicle can also be provided with a sensor device for positioning, which can detect pose information of the vehicle and an operational trajectory of the vehicle, such as a global navigation satellite system (GNSS), an inertial measurement unit (IMU), and the like.

In step S23, wheel stop information in the multi-frame image is identified by a pre-trained wheel stop identification model.

The wheel stop information in the multi-frame image is identified by the pre-trained wheel stop identification model, and the wheel stop information includes a wheel stop type, a wheel stop width, a wheel stop length, pixel coordinates of a wheel stop and the like. It should be noted that the multi-frame image here is obtained in real time by the camera, and the wheel stop identification model also identifies the multi-frame image in real time. Every time the camera obtains an image, the wheel stop identification model performs an image identification.

In one example, the pixel coordinates of the wheel stop in the multi-frame image may be identified by the wheel stop identification model. The wheel stop is then projected on the ground based on the pixel coordinates of the wheel stop. The wheel stop is tracked with a Hungarian algorithm according to a projection of the wheel stop on the ground to obtain the wheel stop type and length in the multi-frame image.

It should be noted that the wheel stop identification model is obtained by pre-training a plurality of sample images. The sample images include positive sample images and negative sample images, where the positive sample images include wheel stops in various parking scenes, and the negative sample images have no wheel stops. Before training the sample images, the sample images are first annotated, annotating wheel stop information in the sample images, and the wheel stop information specifically includes the wheel stop type, the wheel stop width, the wheel stop length, the pixel coordinates of the wheel stop and the like. A method for obtaining the sample images can be as follows: sampling for different distances between the vehicle and the wheel stop in the parking scene, or sampling for wheel stops of different sizes, different types, and different angles, for example, the vehicle is parking and getting closer and closer to the wheel stop, and at this time, sampling can be performed every other certain time, such as 10 ms, 15 ms, etc., in the process of driving the vehicle by a plurality of experienced drivers for parking, so as to obtain sample images including wheel stops of different distances.

In step S24, a wheel stop classification result is obtained by fusing the wheel stop information in the multi-frame image.

The multi-frame image obtained by the camera each time includes different wheel stops at different angles and distances. The wheel stops can be classified according to the wheel stop information identified by the wheel stop identification model, and a same wheel stop can be classified into one category as a first classification result. It should be noted that during classifying for fusing, the first classification result may be updated according to the latest wheel stop information in the multi-frame image of the parking scene newly obtained by the camera to obtain the wheel stop classification result.

In step S25, an initial wheel stop three-dimensional map is built based on a vehicle positioning result and the wheel stop classification result.

The vehicle positioning result includes pose information of a vehicle and an operational trajectory of a vehicle. The pose information, the operational trajectory, and the wheel stop classification result are combined to model a wheel stop as line segments in space. The directions and spatial positions of the line segments are optimally adjusted by bundle adjustment to obtain a first wheel stop three-dimensional map. The first wheel stop three-dimensional map is updated according to the latest wheel stop information in the multi-frame image of the parking scene newly obtained by the camera when a new image is obtained by the camera to get the initial wheel stop three-dimensional map. The visually reconstructed position of the wheel stop in space is thus obtained.

In step S26, a wheel stop three-dimensional map is obtained by revising the initial wheel stop three-dimensional map in combination with wheel stop position information in the point cloud data.

Through the management of the point cloud data, point cloud information near the wheel stop can be obtained, position information of three-dimensional line segments of the wheel stop is fitted by the point cloud near the wheel stop, and the initial wheel stop three-dimensional map is revised according to the position information to obtain the wheel stop three-dimensional map. The wheel stop position information in the point cloud data can obtain more accurate position information than the visual reconstruction results.

After the wheel stop three-dimensional map is obtained, the distance between an autonomous vehicle and a wheel stop can be calculated based on the wheel stop three-dimensional map, and the parking process of the autonomous vehicle is controlled according to the distance. Thus, the vehicle can be controlled to enter a suitable garage depth.

In summary, the mapping method provided by the disclosure includes obtaining the multi-frame image of the parking scene every other first time interval by the camera, obtaining the point cloud data of the parking scene every other second time interval by the laser radar, identifying the wheel stop information in the multi-frame image by the pre-trained wheel stop identification model, fusing the wheel stop information in the multi-frame image to obtain the wheel stop classification result, building the initial wheel stop three-dimensional map based on the vehicle positioning result and the wheel stop classification result, and revising the initial wheel stop three-dimensional map in combination with the wheel stop position information in the point cloud data to obtain the wheel stop three-dimensional map. The image of the parking scene is obtained in real time by the camera device, the wheel stop in the image is identified in real time by the pre-trained wheel stop identification model, the three-dimensional reconstruction of the wheel stop is automatically performed, the point cloud data of the parking scene is obtained in real time by the laser radar device, and the three-dimensional reconstruction of the wheel stop is optimized in combination with the wheel stop position information in the point cloud data to obtain a more accurate wheel stop three-dimensional map, which avoids the problems of high cost and low efficiency of manual annotation.

Figure 3:
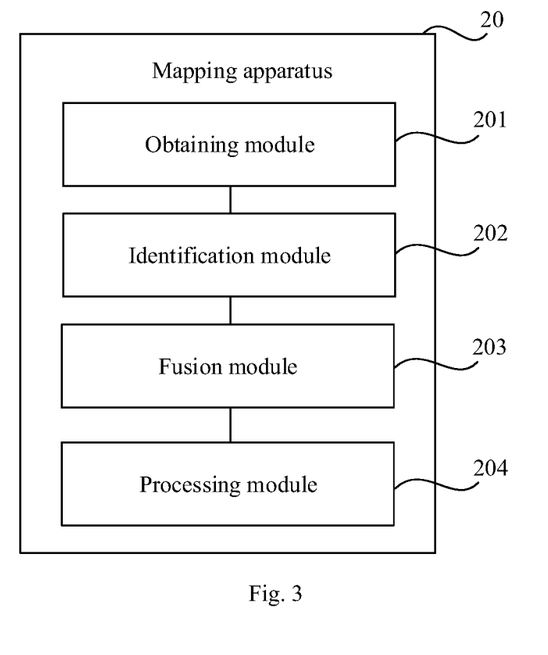
FIG. 3 is a block diagram of a mapping apparatus shown according to one example.

FIG. 3 is a block diagram of a mapping apparatus shown according to one example. Referring to FIG. 3, the mapping apparatus 20 includes an obtaining module 201, an identification module 202, a fusion module 203, and a processing module 204.

The obtaining module 201 is configured to obtain a multi-frame image of a parking scene every other first time interval by a camera;

the obtaining module 201 is further configured to obtain point cloud data of the parking scene every other second time interval by a laser radar;

the identification module 202 is configured to identify wheel stop information in the multi-frame image by a pre-trained wheel stop identification model;

the fusion module 203 is configured to fuse the wheel stop information in the multi-frame image to obtain a wheel stop classification result;

the processing module 204 is configured to build an initial wheel stop three-dimensional map based on a vehicle positioning result and the wheel stop classification result; and the processing module 204 is further configured to revise the initial wheel stop three-dimensional map in combination with wheel stop position information in the point cloud data to obtain a wheel stop three-dimensional map.

In some examples, the identification module 202 is further configured to identify the pixel coordinates of the wheel stop in the multi-frame image by the wheel stop identification model;

project the wheel stop on the ground based on the pixel coordinates of the wheel stop; and track the wheel stop with a Hungarian algorithm according to a projection of the wheel stop on the ground to obtain the wheel stop type and the wheel stop length in the multi-frame image.

In some examples, the fusion module 203 is further configured to classify a same wheel stop into a category according to the wheel stop information as a first classification result; and update the first classification result according to the latest wheel stop information in the multi-frame image of the parking scene newly obtained by the camera to obtain the wheel stop classification result.

In some examples, the processing module 204 is further configured to combine the pose information, the operational trajectory, and the wheel stop classification result to model a wheel stop as line segments in space;

adjust the directions and spatial positions of the line segments by bundle adjustment to obtain a first wheel stop three-dimensional map; and update the first wheel stop three-dimensional map according to the latest wheel stop information in the multi-frame image of the parking scene newly obtained by the camera to obtain the initial wheel stop three-dimensional map.

In some examples, the processing module 204 is further configured to fit position information of three-dimensional line segments of a wheel stop by the point cloud data; and revise the initial wheel stop three-dimensional map according to the position information to obtain the wheel stop three-dimensional map.

In some examples, the processing module 204 is further configured to calculate the distance between an autonomous vehicle and a wheel stop according to the wheel stop three-dimensional map; and control the parking process of the autonomous vehicle according to the distance.

Regarding the apparatus in the above example, a specific manner in which each module performs operations has been described in detail in the example of the method, which will not be described in detail here.

The disclosure also provides a computer-readable storage medium, having computer program instructions stored, where when the program instructions are executed by a processor, the steps of the mapping method provided by the disclosure are implemented.

The above apparatus may be a separate electronic device, or a part of a separate electronic device, for example, in one example, the apparatus may be an integrated circuit (IC) or a chip, where the integrated circuit may be one IC or a collection of a plurality of ICs; the chip may include, but is not limited to, the following categories: GPU (Graphics Processing Unit), CPU (Central Processing Unit), FPGA (Field Programmable Gate Array), DSP (Digital Signal Processor), ASIC (Application Specific Integrated Circuit), SOC (System on Chip, SoC), etc. The integrated circuit or the chip may be used to execute executable instructions (or codes) to implement the above mapping method. The executable instructions may be stored in the integrated circuit or the chip, or obtained from other apparatuses or devices, for example, the integrated circuit or the chip includes a first processor, a first memory, and an interface for communicating with other apparatuses. The executable instructions may be stored in the first memory, and when the executable instructions are executed by the first processor, the mapping method is implemented; or, the integrated circuit or the chip may receive executable instructions via the interface and transmit the executable instructions to the first processor for execution to implement the mapping method.

Figure 4:
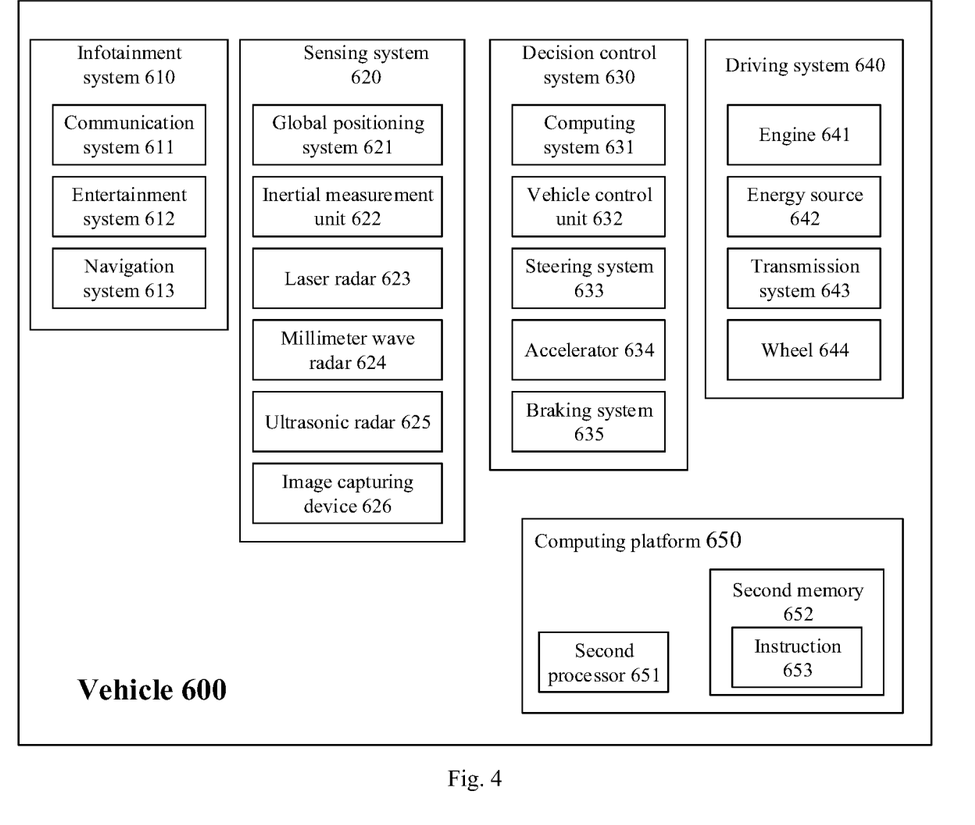
FIG. 4 is a schematic functional block diagram of a vehicle shown according to one example.

Referring to FIG. 4, FIG. 4 is a schematic functional block diagram of a vehicle 600 shown according to one example. The vehicle 600 may be configured in a fully or partially autonomous driving mode. For example, the vehicle 600 may obtain its surrounding environment information through a sensing system 620 and obtain an autonomous driving strategy based on the analysis of the surrounding environment information to realize fully autonomous driving, or present the analysis result to the user to realize partially autonomous driving.

The vehicle 600 may include various subsystems, for example, an infotainment system 610, a sensing system 620, a decision control system 630, a driving system 640, and a computing platform 650. In some examples, the vehicle 600 may include more or fewer subsystems, and each subsystem may include a plurality of components. Additionally, each subsystem and component of the vehicle 600 may be interconnected in a wired or wireless manner.

In some examples, the infotainment system 610 may include a communication system 611, an entertainment system 612, and a navigation system 613.

The communication system 611 can include a wireless communication system that can wirelessly communicate with one or more devices, either directly or via a communication network. For example, the wireless communication system may use 3G cellular communication, such as CDMA, EVDO, GSM/GPRS, or 4G cellular communication, such as LTE or 5G cellular communication. The wireless communication system may utilize WiFi to communicate with a wireless local area network (WLAN). In some examples, the wireless communication system may directly communicate with a device using an infrared link, Bluetooth, or ZigBee. Other wireless protocols, such as various vehicle communication systems, for example, the wireless communication system may include one or more dedicated short-range communication (DSRC) devices, which may include public and/or private data communications between vehicles and/or roadside stations.

The entertainment system 612 may include a display device, a microphone, and a sound, and the user may listen to broadcasts and play music within the vehicle based on the entertainment system; or a mobile phone communicates with the vehicle to realize the screen projection of the mobile phone on the display device, the display device can be touch-sensitive, and the user can perform an operation by touching the screen.

In some cases, a user's voice signal may be obtained through the microphone, and some controls on the vehicle 600 by the user, such as adjusting the temperature in the vehicle, are implemented according to the analysis of the user's voice signal. In other cases, music may be played to the user through the sound system.

The navigation system 613 may include a map service from a map provider to provide navigation of a driving route for the vehicle 600. The navigation system 613 may cooperate with a global positioning system 621 and an inertial measurement unit 622 of the vehicle. The map service provided by the map provider can be a two-dimensional map or a high-precision map.

The sensing system 620 may include a number of sensors that sense information about the environment surrounding the vehicle 600. For example, the sensing system 620 may include a global positioning system 621 (the global positioning system may be a GPS or a BeiDou system, or other positioning systems), an inertial measurement unit (IMU) 622, a laser radar 623, a millimeter wave radar 624, an ultrasonic radar 625, and an image capturing device 626. The sensing system 620 may also include sensors of internal systems of the vehicle 600 monitored (e.g., an air quality monitor, a fuel gauge, an oil temperature gauge, etc. in the vehicle). Sensor data from one or more of these sensors may be used to detect objects and their respective characteristics (position, shape, direction, speed, etc.). Such detection and identification are critical functions for the safe operation of the vehicle 600.

The global positioning system 621 is configured to estimate the geographic location of the vehicle 600.

The inertial measurement unit 622 is configured to sense changes in the pose of the vehicle 600 based on inertial acceleration. In some examples, the inertial measurement unit 622 may be a combination of an accelerometer and a gyroscope.

The laser radar 623 uses lasers to sense objects in the environment where the vehicle 600 is located. In some examples, the laser radar 623 may include one or more laser sources, a laser scanner, and one or more detectors, as well as other system components.

The millimeter wave radar 624 uses radio signals to sense objects within the surrounding environment of the vehicle 600. In some examples, in addition to sensing the objects, the millimeter wave radar 624 may also be configured to sense the speed and/or the forward direction of the objects.

The ultrasonic radar 625 may use ultrasonic signals to sense objects around the vehicle 600.

The image-capturing device 626 is configured to capture image information of the surrounding environment of the vehicle 600. The image-capturing device 626 may include a monocular camera, a binocular camera, a structured light camera, a panoramic camera, and the like. The image information obtained by the image-capturing device 626 may include still images or video stream information.

The decision control system 630 includes a computing system 631 for analyzing and making decisions based on information obtained by the sensing system 620. The decision control system 630 also includes a vehicle control unit 632 that controls the power system of the vehicle 600, and a steering system 633, an accelerator 634, and a braking system 635 for controlling the vehicle 600.

The computing system 631 may operate to process and analyze various information obtained by the sensing system 620 in order to identify targets, objects, and/or features in the environment power surrounding the vehicle 600. The targets may include pedestrians or animals, and the objects and/or features may include traffic signals, road boundaries, and obstacles. The computing system 631 can use object recognition algorithms, structure from motion (SFM) algorithms, video tracking, and the like. In some examples, the computing system 631 can be configured to map the environment, track objects, estimate the speed of objects, and the like. The computing system 631 can analyze the obtained various information and obtain a control strategy for the vehicle.

The vehicle control unit 632 may be configured to coordinately control a power battery and an engine 641 of the vehicle to improve the power performance of the vehicle 600.

The steering system 633 is operable to adjust the forward direction of the vehicle 600. For example, in one example, the steering system 633 may be a steering wheel system.

The accelerator 634 is configured to control the operating speed of the engine 641 and, thus, the speed of the vehicle 600.

The braking system 635 is configured to control the deceleration of the vehicle 600. The braking system 635 may use friction to slow the speed of wheels 644. In some examples, the braking system 635 may convert the kinetic energy of the wheels 644 to an electric current. The braking system 635 may also take other forms to slow down the speed of the wheels 644 to control the speed of the vehicle 600.

The driving system 640 may include components that provide powered motion for the vehicle 600. In one example, the driving system 640 may include an engine 641, an energy source 642, a transmission system 643, and wheels 644. The engine 641 may be an internal combustion engine, an electric motor, an air compression engine, or other types of engine combinations, such as a hybrid engine of a gasoline engine and the electric motor, and a hybrid engine of the internal combustion engine and the air compression engine. The engine 641 converts the energy source 642 into mechanical energy.

Examples of the energy source 642 include gasoline, diesel, other petroleum-based fuels, propane, other compressed gas-based fuels, ethanol, solar panels, batteries, and other power sources. The energy source 642 may also provide energy for other systems of the vehicle 600.

The transmission system 643 may transmit mechanical power from the engine 641 to the wheels 644. The transmission system 643 can include a gearbox, a differential, and a drive shaft. In one example, the transmission system 643 may also include other devices, such as a clutch. The drive shaft may include one or more shafts that may be coupled to one or more wheels 644.

Some or all of the functions of the vehicle 600 are controlled by the computing platform 650. The computing platform 650 may include at least one second processor 651 that may execute instructions 653 stored in a non-transitory computer-readable medium, such as a second memory 652. In some examples, the computing platform 650 may also be a plurality of computing devices that control individual components or subsystems of the vehicle 600 in a distributed manner.

The second processor 651 can be any conventional second processor, such as a commercially available CPU. Alternatively, the second processor 651 may further include, for example, a graphic process unit (GPU), a field programmable gate array (FPGA), a system on chip (SOC), an application-specific integrated circuit (ASIC), or their combination. Although FIG. 4 functionally illustrates the second processor, the second memory, and other elements of a computer in a same block, it should be understood by those of ordinary skill in the art that the second processor, computer, or second memory may, in fact, include a plurality of second processors, computers, or second memories that may or may not be stored within a same physical housing. For example, the second memory may be a hard drive or other storage medium located within a housing different from the computer. Accordingly, reference to the second processor or computer will be understood to include reference to a collection of second processors or computers or second memories that may or may not operate in parallel. Rather than using a single second processor to perform the steps described here, some components, such as a steering component and a deceleration component, may each have their own second processor that only performs calculations related to the component-specific functions.

In the examples of the disclosure, the second processor 651 may perform the mapping method.

In various aspects described here, the second processor 651 can be located remotely from the vehicle and in wireless communication with the vehicle. In other aspects, some of the processes described here are performed on a second processor disposed within the vehicle, while others are performed by a remote second processor, including taking the necessary steps to perform a single manipulation.

In some examples, the second memory 652 may contain instructions 653 (e.g., program logic) that can be executed by the second processor 651 to perform various functions of the vehicle 600. The second memory 652 may also contain additional instructions, including instructions to transmit data to, receive data from, interact with, and/or control one or more of the infotainment system 610, the sensing system 620, the decision control system 630, and the driving system 640.

In addition to the instructions 653, the second memory 652 may also store data, such as road maps, route information, the location, direction, speed of the vehicle, and other such vehicle data, as well as other information. Such information may be used by the vehicle 600 and the computing platform 650 during the operation of the vehicle 600 in autonomous, semi-autonomous, and/or manual modes.

The computing platform 650 may control the functions of the vehicle 600 based on inputs received from various subsystems (e.g., the driving system 640, the sensing system 620, and the decision control system 630). For example, the computing platform 650 may utilize input from the decision control system 630 in order to control the steering system 633 to avoid obstacles detected by the sensing system 620. In some examples, the computing platform 650 may be operable to provide control over many aspects of the vehicle 600 and its subsystems.

In some examples, one or more of these components described above may be separately mounted or associated with the vehicle 600. For example, the second memory 652 may exist partially or entirely separate from the vehicle 600. The above components may be communicatively coupled in a wired and/or wireless manner.

In some examples, the above components are only one example, and in practical applications, components of the above modules may be added or deleted according to practical needs, and FIG. 4 should not be understood as limiting the examples of the disclosure.

An autonomous car traveling on the road, such as the above vehicle 600, may identify objects within its surrounding environment to determine an adjustment to the current speed. The objects may be other vehicles, traffic control devices, or objects of a different nature. In some examples, each identified object may be considered independently, and the respective characteristics of the objects, such as its current speed, acceleration, spacing from the vehicle, etc., may be used to determine a speed to be adjusted by the autonomous car.

In some examples, the vehicle 600 or sensing and computing devices associated with the vehicle 600 (e.g., the computing system 631 and the computing platform 650) may predict the behaviors of the identified objects based on the characteristics of the identified objects and the state of the surrounding environment (e.g., traffic, rain, ice on a road, etc.). In some examples, each identified object depends on the behavior of each other, so all identified objects may also be considered together to predict the behavior of a single identified object. The vehicle 600 can adjust its speed based on the predicted behaviors of the identified objects. In other words, the autonomous car can determine what stable state the vehicle will need to adjust to (e.g., accelerated, decelerated, or stopped) based on the predicted behaviors of the objects. This process may also consider other factors to determine the speed of the vehicle 600, such as the lateral position of the vehicle 600 in the road on which it travels, the curvature of the road, the proximity of static and dynamic objects, and the like.

In addition to providing instructions to adjust the speed of the autonomous car, the computing device may also provide instructions to modify the steering angle of the vehicle 600 to cause the autonomous car to follow a given trajectory and/or maintain a safe lateral and longitudinal distance from objects near the autonomous car (e.g., vehicles in adjacent lanes on the road).

The vehicle 600 may be various types of traveling tools, for example, a car, a truck, a motorcycle, a bus, a boat, an airplane, a helicopter, a recreational vehicle, a train, and the like, which is not particularly limited in the examples of the disclosure.

In another example, also provided is a computer program product, including a computer program that can be executed by a programmable apparatus, where the computer program has code portions for performing the mapping method when executed by the programmable apparatus.

After considering the description and practicing the disclosure, those skilled in the art will easily think of other examples of the disclosure. The disclosure is intended to cover any variations, uses, or adaptations of the disclosure, and these variations, uses or adaptations follow the general principles of the disclosure and include the common general knowledge or frequently used technical means in the technical field not disclosed in the disclosure. The description and examples are only regarded as illustrative, and the true scope and spirit of the disclosure are indicated by the following claims.

It should be understood that the disclosure is not limited to the precise structures described above and shown in the drawings, and various modifications and changes can be made without departing from the scope of the disclosure. The scope of the disclosure is limited only by the appended claims.

According to a first aspect of the examples of the disclosure, provided is a mapping method, including: obtaining a multi-frame image of a parking scene every other first time interval by a camera; obtaining point cloud data of the parking scene every other second time interval by a laser radar; identifying wheel stop information in the multi-frame image by a pre-trained wheel stop identification model; fusing the wheel stop information in the multi-frame image to obtain a wheel stop classification result; building an initial wheel stop three-dimensional map based on a vehicle positioning result and the wheel stop classification result; and revising the initial wheel stop three-dimensional map in combination with wheel stop position information in the point cloud data to obtain a wheel stop three-dimensional map.

In some examples, the wheel stop information includes a wheel stop type, a wheel stop width, a wheel stop length, and pixel coordinates of a wheel stop; and identifying the wheel stop information in the multi-frame image by the wheel stop identification model includes identifying the pixel coordinates of the wheel stop in the multi-frame image by the wheel stop identification model; projecting the wheel stop on the ground based on the pixel coordinates of the wheel stop; and tracking the wheel stop with a Hungarian algorithm according to a projection of the wheel stop on the ground to obtain the wheel stop type and the wheel stop length in the multi-frame image.

In some examples, fusing the wheel stop information in the multi-frame image to obtain the wheel stop classification result includes: classifying a same wheel stop into a category according to the wheel stop information as a first classification result; and updating the first classification result according to the latest wheel stop information in the multi-frame image of the parking scene newly obtained by the camera to get the wheel stop classification result.

In some examples, the vehicle positioning result includes pose information of a vehicle and an operational trajectory of a vehicle; and building the initial wheel stop three-dimensional map based on the vehicle positioning result and the wheel stop classification result includes: combining the pose information, the operational trajectory, and the wheel stop classification result to model a wheel stop as line segments in space; adjusting the directions and spatial positions of the line segments by bundle adjustment to obtain a first wheel stop three-dimensional map; and updating the first wheel stop three-dimensional map according to the latest wheel stop information in the multi-frame image of the parking scene newly obtained by the camera to obtain the initial wheel stop three-dimensional map.

In some examples, revising the initial wheel stop three-dimensional map in combination with the wheel stop position information in the point cloud data to obtain the wheel stop three-dimensional map includes fitting position information of three-dimensional line segments of a wheel stop by the point cloud data; and revising the initial wheel stop three-dimensional map according to the position information to obtain the wheel stop three-dimensional map.

In some examples, the method further includes: calculating the distance between an autonomous vehicle and a wheel stop according to the wheel stop three-dimensional map; and controlling the parking process of the autonomous vehicle according to the distance.

According to a second aspect of the examples of the disclosure, provided is a mapping apparatus, including: an obtaining module, configured to obtain a multi-frame image of a parking scene every other first time interval by a camera; where the obtaining module is further configured to obtain point cloud data of the parking scene every other second time interval by a laser radar; an identification module, configured to identify wheel stop information in the multi-frame image by a pre-trained wheel stop identification model; a fusion module, configured to fuse the wheel stop information in the multi-frame image to obtain a wheel stop classification result; and a processing module, configured to build an initial wheel stop three-dimensional map based on a vehicle positioning result and the wheel stop classification result; where the processing module is further configured to revise the initial wheel stop three-dimensional map in combination with wheel stop position information in the point cloud data to obtain a wheel stop three-dimensional map.

According to a third aspect of the disclosure examples, provided is a vehicle, including: a processor; and a memory configured to store processor-executable instructions, where the processor is configured to execute the executable instructions to implement the steps of the mapping method.

According to a fourth aspect of the examples of the disclosure, provided is a computer-readable storage medium, having computer program instructions stored, where when the computer program instructions are executed by a processor, the steps of the mapping method provided in the first aspect of the disclosure are implemented.

According to a fifth aspect of the examples of the disclosure, provided is a chip, including a processor and an interface; where the processor is configured to read instructions to perform the steps of the mapping method.

The technical solution provided by the examples of the disclosure may include the following beneficial effects: the multi-frame image of the parking scene is obtained every other first time interval by the camera, the point cloud data of the parking scene is obtained every other second time interval by the laser radar, the wheel stop information in the multi-frame image is identified by the pre-trained wheel stop identification model, the wheel stop information in the multi-frame image is fused to obtain the wheel stop classification result, the initial wheel stop three-dimensional map is built based on the vehicle positioning result and the wheel stop classification result, and the initial wheel stop three-dimensional map is revised in combination with the wheel stop position information in the point cloud data to obtain the wheel stop three-dimensional map; and the image of the parking scene is obtained in real time by a camera device, the wheel stop in the image is identified in real time by the pre-trained wheel stop identification model, the three-dimensional reconstruction of the wheel stop is automatically performed, the point cloud data of the parking scene is obtained in real time by a laser radar device, and the three-dimensional reconstruction of the wheel stop is optimized in combination with the wheel stop position information in the point cloud data to obtain a more accurate wheel stop three-dimensional map, which avoids the problems of high cost and low efficiency of manual annotation.

The invention claimed is:

1. A mapping method, comprising:
    obtaining a multi-frame image of a parking scene by a camera every other first time interval;
    obtaining point cloud data of the parking scene by a laser radar every other second time interval;
    identifying wheel stop information in the multi-frame image by a pre-trained wheel stop identification model, wherein the wheel stop information comprises a wheel stop type, a wheel stop width, a wheel stop length, and pixel coordinates of a wheel stop;
    obtaining a wheel stop classification result by fusing the wheel stop information in the multi-frame image;
    building an initial wheel stop three-dimensional map based on a vehicle positioning result and the wheel stop classification result; and obtaining a wheel stop three-dimensional map by revising the initial wheel stop three-dimensional map in combination with wheel stop position information in the point cloud data, wherein identifying the wheel stop information in the multi-frame image by the pre-trained wheel stop identification model comprises:

identifying the pixel coordinates of the wheel stop in the multi-frame image by the wheel stop identification model, projecting the wheel stop on the ground based on the pixel coordinates of the wheel stop, and tracking the wheel stop with a Hungarian algorithm according to a projection of the wheel stop on the ground to obtain the wheel stop type and the wheel stop length in the multi-frame image.

2. The method according to claim 1, wherein obtaining the wheel stop classification result by fusing the wheel stop information in the multi-frame image comprises:

classifying a same wheel stop into a category according to the wheel stop information as a first classification result; and obtaining the wheel stop classification result by updating the first classification result according to latest wheel stop information in the multi-frame image of the parking scene newly obtained by the camera.

3. The method according to claim 1, wherein the vehicle positioning result comprises pose information of a vehicle and an operational trajectory of a vehicle; and building the initial wheel stop three-dimensional map based on the vehicle positioning result and the wheel stop classification result comprises:

combining the pose information, the operational trajectory, and the wheel stop classification result to model a wheel stop as line segments in space;

adjusting directions and spatial positions of the line segments by bundle adjustment to obtain a first wheel stop three-dimensional map; and updating the first wheel stop three-dimensional map according to latest wheel stop information in the multi-frame image of the parking scene newly obtained by the camera to obtain the initial wheel stop three-dimensional map.

4. The method according to claim 1, wherein obtaining the wheel stop three-dimensional map by revising the initial wheel stop three-dimensional map in combination with the wheel stop position information in the point cloud data comprises:

fitting position information of three-dimensional line segments of the wheel stop by the point cloud data; and obtaining the wheel stop three-dimensional map by revising the initial wheel stop three-dimensional map in combination with the wheel stop position information according to the position information of the three-dimensional line segments of the wheel stop.

5. The method according to claim 1, further comprising:

calculating a distance between an autonomous vehicle and the wheel stop according to the wheel stop three-dimensional map; and controlling a parking process of the autonomous vehicle according to the distance.

6. A vehicle, comprising:

a processor; and a memory configured to store processor-executable instructions;

wherein the processor is configured to:

obtain a multi-frame image of a parking scene by a camera every other first time interval;

obtain point cloud data of the parking scene by a laser radar every other second time interval;

identify wheel stop information in the multi-frame image by a pre-trained wheel stop identification model, wherein the wheel stop information comprises a wheel stop type, a wheel stop width, a wheel stop length, and pixel coordinates of a wheel stop;

obtain a wheel stop classification result by fusing the wheel stop information in the multi-frame image;

build an initial wheel stop three-dimensional map based on a vehicle positioning result and the wheel stop classification result;

obtain a wheel stop three-dimensional map by revising the initial wheel stop three-dimensional map in combination with wheel stop position information in the point cloud data;

identify the pixel coordinates of the wheel stop in the multi-frame image by the wheel stop identification model;

project the wheel stop on the ground based on the pixel coordinates of the wheel stop; and track the wheel stop with a Hungarian algorithm according to a projection of the wheel stop on the ground to obtain the wheel stop type and the wheel stop length in the multi-frame image.

7. The vehicle according to claim 6, wherein the processor is configured to:

classify a same wheel stop into a category according to the wheel stop information as a first classification result; and obtain the wheel stop classification result by updating the first classification result according to latest wheel stop information in the multi-frame image of the parking scene newly obtained by the camera.

8. The vehicle according to claim 6, wherein the vehicle positioning result comprises pose information of a vehicle and an operational trajectory of a vehicle; and the processor is configured to:

combine the pose information, the operational trajectory, and the wheel stop classification result to model a wheel stop as line segments in space;

adjust directions and spatial positions of the line segments by bundle adjustment to obtain a first wheel stop three-dimensional map; and update the first wheel stop three-dimensional map according to latest wheel stop information in the multi-frame image of the parking scene newly obtained by the camera to obtain the initial wheel stop three-dimensional map.

9. The vehicle according to claim 6, wherein the processor is configured to:

fit position information of three-dimensional line segments of the wheel stop by the point cloud data; and obtain the wheel stop three-dimensional map by revising the initial wheel stop three-dimensional map in combination with the wheel stop position information according to the position information of the three-dimensional line segments of the wheel stop.

10. The vehicle according to claim 6, the processor is further configured to:

calculate a distance between an autonomous vehicle and the wheel stop according to the wheel stop three-dimensional map; and control a parking process of the autonomous vehicle according to the distance.

11. A non-transitory computer-readable storage medium, having computer program instructions stored thereon, the computer program instructions are executed by a processor, the processor cause the processor to execute a method comprising:
- obtain a multi-frame image of a parking scene by a camera every other first time interval;
- obtain point cloud data of the parking scene by a laser radar every other second time interval;
- identify wheel stop information in the multi-frame image by a pre-trained wheel stop identification model, wherein the wheel stop information comprises a wheel stop type, a wheel stop width, a wheel stop length, and pixel coordinates of a wheel stop;
- obtain a wheel stop classification result by fusing the wheel stop information in the multi-frame image;
- build an initial wheel stop three-dimensional map based on a vehicle positioning result and the wheel stop classification result;
- obtain a wheel stop three-dimensional map by revising the initial wheel stop three-dimensional map in combination with wheel stop position information in the point cloud data;
- identify the pixel coordinates of the wheel stop in the multi-frame image by the wheel stop identification model;
- project the wheel stop on the ground based on the pixel coordinates of the wheel stop; and
- track the wheel stop with a Hungarian algorithm according to a projection of the wheel stop on the ground to obtain the wheel stop type and the wheel stop length in the multi-frame image.

12. The non-transitory computer-readable storage medium according to claim 11, when the computer program instructions are executed by the processor, the processor is caused to:
- classify a same wheel stop into a category according to the wheel stop information as a first classification result; and
- update the first classification result according to latest wheel stop information in the multi-frame image of the parking scene newly obtained by the camera to obtain the wheel stop classification result.

13. The non-transitory computer-readable storage medium according to claim 11, wherein the vehicle positioning result comprises pose information of a vehicle and an operational trajectory of the vehicle; and when the computer program instructions are executed by the processor, the processor is caused to:
- combine the pose information, the operational trajectory, and the wheel stop classification result to model a wheel stop as line segments in space;
- adjust directions and spatial positions of the line segments by bundle adjustment to obtain a first wheel stop three-dimensional map; and
- update the first wheel stop three-dimensional map according to latest wheel stop information in the multi-frame image of the parking scene newly obtained by the camera to obtain the initial wheel stop three-dimensional map.

14. The non-transitory computer-readable storage medium according to claim 13, when the computer program instructions are executed by the processor, the processor is caused to:
- fit position information of three-dimensional line segments of the wheel stop by the point cloud data; and
- obtain the wheel stop three-dimensional map by revising the initial wheel stop three-dimensional map in combination with the wheel stop position information according to the position information of the three-dimensional line segments of the wheel stop.

15. The non-transitory computer-readable storage medium according to claim 13, when the computer program instructions are executed by the processor, the processor is further caused to:
- calculate a distance between an autonomous vehicle and the wheel stop according to the wheel stop three-dimensional map; and
- control a parking process of the autonomous vehicle according to the distance.

16. A chip, comprising:
an interface; and
a processor that is communicatively coupled to the interface, wherein the processor is configured to perform the method according to claim 1.

* * * * *

UNITED STATES PATENT AND TRADEMARK OFFICE
CERTIFICATE OF CORRECTION

| | | |
|---|---|---|
| PATENT NO. | : 12,319,275 B2 | Page 1 of 1 |
| APPLICATION NO. | : 17/977197 | |
| DATED | : June 3, 2025 | |
| INVENTOR(S) | : Shiwei Gong | |

It is certified that error appears in the above-identified patent and that said Letters Patent is hereby corrected as shown below:

On the Title Page

On Page 2, in Item (56), under "OTHER PUBLICATIONS", in Column 2, Line 9, delete ""Dotloom:Toward" and insert -- "Dotloom: Toward --, therefor.

On Page 2, in Item (56), under "OTHER PUBLICATIONS", in Column 2, Line 18, delete "202210832856X." and insert -- 202210832856.X. --, therefor.

In the Specification

In Column 2, Line 28, delete "of'" and insert -- of" --, therefor.

In the Claims

In Column 18, Line 20, in Claim 14, delete "according to claim 13" and insert -- according to claim 11, --, therefor.

In Column 18, Line 32, in Claim 15, delete "according to claim 13" and insert -- according to claim 11, --, therefor.

Signed and Sealed this
Twelfth Day of August, 2025

Coke Morgan Stewart
*Acting Director of the United States Patent and Trademark Office*